(12) United States Patent
Dupont et al.

(10) Patent No.: US 10,192,326 B2
(45) Date of Patent: Jan. 29, 2019

(54) METHODS FOR COMPRESSING AND DECOMPRESSING DATA REPRESENTING A DIGITAL THREE-DIMENSIONAL OBJECT AND INFORMATION-RECORDING MEDIUM FOR RECORDING INFORMATION CONTAINING SAID DATA

(71) Applicants: INSTITUT NATIONAL DES SCIENCES APPLIQUÉES DE LYON, Villeurbanne (FR); UNIVERSITÉ LYON 1 CLAUDE BERNARD, Villeurbanne (FR); CENTRE NATIONAL DE LA RECHERCHE SCIENTIFIQUE, Paris (FR); UNIVERSITÉ LYON 2 A.ET .L LUMIÉRE, Lyons (FR); ECOLE CENTRALE DE LYON, Ecully (FR)

(72) Inventors: Florent Dupont, Fontaines sur Saone (FR); Guillaume Lavoue, Villeurbanne (FR); Laurent Chevalier, Lyons (FR)

( * ) Notice: Subject to any disclaimer, the term of this patent is extended or adjusted under 35 U.S.C. 154(b) by 0 days.

(21) Appl. No.: 15/528,275

(22) PCT Filed: Nov. 18, 2015

(86) PCT No.: PCT/FR2015/053122
§ 371 (c)(1),
(2) Date: May 19, 2017

(87) PCT Pub. No.: WO2016/079430
PCT Pub. Date: May 26, 2016

(65) Prior Publication Data
US 2017/0365069 A1 Dec. 21, 2017

(30) Foreign Application Priority Data
Nov. 21, 2014 (FR) ...................... 14 61318

(51) Int. Cl.
*G06T 9/00* (2006.01)
*G06T 17/20* (2006.01)
*G06T 15/04* (2011.01)

(52) U.S. Cl.
CPC .............. *G06T 9/001* (2013.01); *G06T 15/04* (2013.01); *G06T 17/205* (2013.01)

(58) Field of Classification Search
None
See application file for complete search history.

(56) References Cited

U.S. PATENT DOCUMENTS

| 6,167,159 A | 12/2000 | Touma et al. |
| 6,208,347 B1 | 3/2001 | Migdal et al. |
| (Continued) |

FOREIGN PATENT DOCUMENTS

| EP | 0889440 | 1/1999 |
| FR | 2781908 | 2/2000 |
| (Continued) |

OTHER PUBLICATIONS

Hoppe, H. "Efficient Implementation of Progressive Meshes" Computers and Graphics, vol. 22(1):27-36 (1998).

(Continued)

*Primary Examiner* — Xiao Wu
*Assistant Examiner* — Mohammad H Akhavannik
(74) *Attorney, Agent, or Firm* — Occhiuti & Rohlicek LLP

(57) ABSTRACT

A compression method includes simplifying a mesh that represents a textured 3D-object by replacing polygons in the mesh with new ones that have broader faces. The method includes identifying adjacent polygons with different textures and adding vertices at the same positions as two vertices in the polygons. This creates two new edges and an intermediate polygon interposed between the two adjacent (Continued)

polygons. The new edges have zero length and the new polygon has zero area.

10 Claims, 3 Drawing Sheets

(56) References Cited

U.S. PATENT DOCUMENTS

| | | | |
|---|---|---|---|
| 6,931,155 B1 | 8/2005 | Gioia | |
| 2002/0063707 A1* | 5/2002 | Kawanaka | G06T 17/20 345/423 |
| 2004/0164982 A1 | 8/2004 | Fujiwara et al. | |
| 2011/0046923 A1 | 2/2011 | Lee et al. | |
| 2013/0106834 A1* | 5/2013 | Curington | G06T 9/00 345/419 |
| 2013/0271463 A1* | 10/2013 | Curington | G06T 9/001 345/420 |
| 2017/0091997 A1* | 3/2017 | Tuffreau | G06T 17/205 |

FOREIGN PATENT DOCUMENTS

| | | |
|---|---|---|
| FR | 2794881 | 12/2000 |
| FR | 2998685 | 5/2014 |
| WO | WO 97/06512 | 2/1997 |
| WO | WO 00/77737 | 12/2000 |

OTHER PUBLICATIONS

Hoppe, H. "Progressive Meshes", Computer Graphics Proceedings, Siggraph '96, ACM, New York, US, Jan. 1, 1996.

Liu et al., "Feature-Preserving Simplification of Texture-Mapped Models", International Conference on Computer Graphics, Imaging and Visualization (CGIV'06), Jan. 1, 2006 (pp. 390-395).

Lee et al., "Rate-Distortion Optimization for Progressive Compression of 3D Mesh with Color Attributes" The Visual Computer, vol. 28, pp. 137-153 (2011).

Wang et al., "Simplification for Texture Mapping Models with Mesh Segmentation," Virtual Systems and Multimedia (VSMM), 2010 16$^{th}$ International Conference on IEEE, Piscataway, NJ Oct. 20, 2010, pp. 197-203.

Lavoué et al., "Streaming Compressed 3D Date on the Web Using JavaScript and WebGL" Web3D'13, Proceedings of the 18$^{th}$ International Conference on 3D Web Technology, San Sebastian, Spain Jun. 20, 2013, pp. 19-27.

* cited by examiner

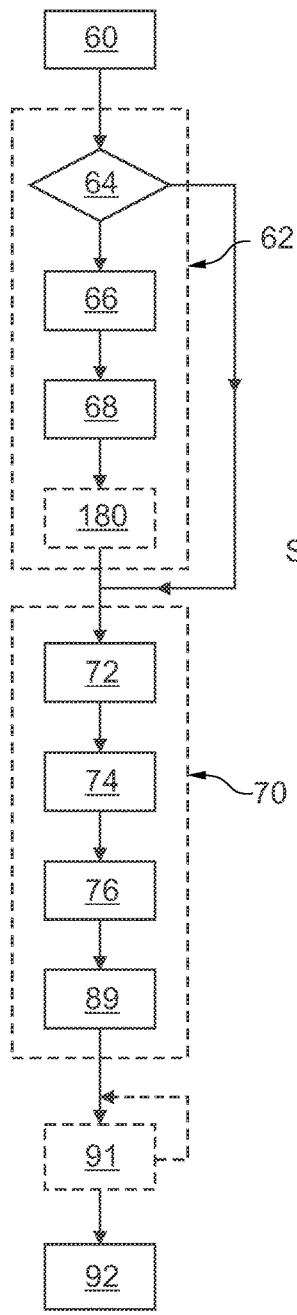
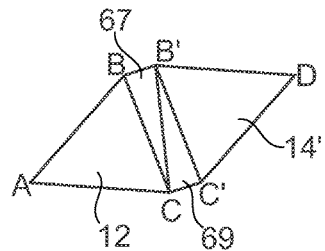
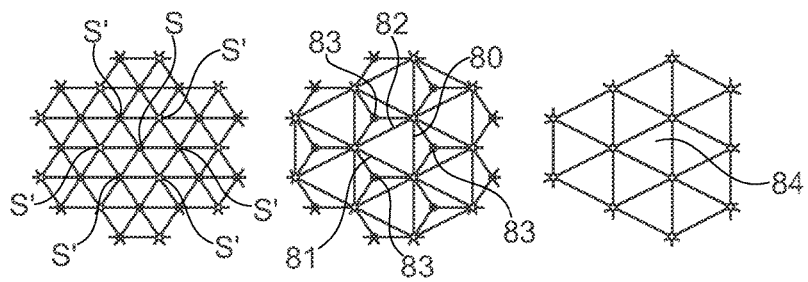
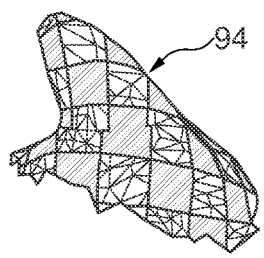
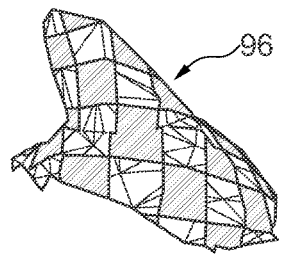
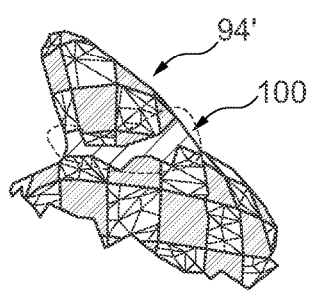
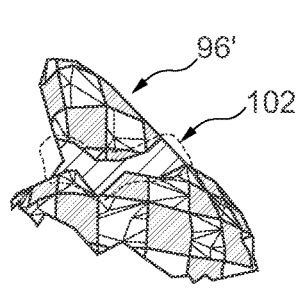
Fig. 4   Fig. 5   Fig. 6A   Fig. 6B   Fig. 6C   Fig. 7A   Fig. 7B   Fig. 8A   Fig. 8B

METHODS FOR COMPRESSING AND DECOMPRESSING DATA REPRESENTING A DIGITAL THREE-DIMENSIONAL OBJECT AND INFORMATION-RECORDING MEDIUM FOR RECORDING INFORMATION CONTAINING SAID DATA

RELATED APPLICATIONS

This application is the national stage of international application PCT/FR2015/053122, filed on Nov. 18, 2015, which claims the benefit of the Nov. 21, 2014 priority date of French application FR1461318, the contents of which are herein incorporated by reference.

FIELD OF INVENTION

The invention concerns data compression, and in particular, compression and decompression of data representative of a three-dimensional object.

BACKGROUND

Typically, in the field of computer vision and three-dimensional computer graphics, a three-dimensional object is represented digitally in the form of a polygonal mesh. This mesh is formed from a plurality of planar polygons which are contiguous with each other. Each polygon comprises a plurality of vertices interconnected by edges which delimit one face of the polygon.

Progressive compression methods facilitate transmission of a three-dimensional object from a server of multimedia content to a client terminal on which the object needs to be displayed. In these methods, the mesh is gradually simplified by decimating vertices in order. This reduces the mesh size. The simplified mesh is transmitted to the terminal, where it is displayed. It is then gradually reconstructed on this terminal from incremental data transmitted afterwards until the three-dimensional object such as it was initially prior to the compression is recovered.

Certain three-dimensional objects are textured. This means that the polygons of the mesh have their surface covered by a digital image, known as a "texture."

Difficulties arise when the object is textured. In such cases, during the progressive displaying of the three-dimensional object in the course of the decompression, these methods can generate graphic artifacts.

SUMMARY

The invention provides a method of progressive compression of a three-dimensional object that limits the appearance of such graphic artifacts on the object when it contains textures.

In data compression, a problem occurs when a three-dimensional object contains polygons adjacent to each other and whose textures are different. The problem occurs in particular in the area of borders between portions of the object having very different textures from each other.

One compression method selects the vertices to be eliminated as a function of geometrical properties of the mesh, without considering texture information of the polygons. Thus, the common edge separating these adjacent polygons may be eliminated on account of the simplification. The information concerning the fact that, prior to simplification of the mesh, different textures existed on either side of the edge so eliminated, is thus absent from the resulting simplified mesh. Hence, during the decompression, when this simplified mesh is displayed, a graphic artifact will appear. This degrades the visual quality of the three-dimensional object perceived during its decompression.

In the above method, the finding of first and second polygons makes it possible to identify the polygons where an artifact is liable to appear if the simplification were done directly. The replacement, in the second polygon, of the first and second shared vertices by third and fourth distinct vertices and the creation of the edges makes it possible to separate the first and second polygons. They are thus no longer adjacent to each other. Hence, for example, the deletion of the first or the second vertex does not entail as a consequence the disappearance of the first and second polygons at the same time. During the compression, the information concerning the texture difference is thus preserved at least insofar as the first, second, third and fourth vertices have not been deleted from the simplified mesh. This information is thus preserved longer during the compression process. Therefore, on the other hand, during the decompression this information will reappear much earlier in the simplified mesh displayed on the screen. One thus minimizes the time during which such an artifact is visible, which improves the visual quality of the object displayed in the course of the decompression.

Finally, since the third and fourth vertices occupy the same position as the first and second vertices and the length of the edges is zero, the outer appearance of the object has not been modified by this creation of supplemental vertices.

According to another aspect, the invention further concerns a set of compressed data representative of a three-dimensional digital object.

According to another aspect, the invention further concerns an information recording medium containing the set of data representative of a three-dimensional digital object compressed according to the invention.

According to another aspect, the invention further concerns a method of decompressing data representative of a three-dimensional digital object.

According to another aspect, the invention further concerns a method of transmission of data representative of a three-dimensional digital object between a transmitter and a receiver, the method involving: the compression of the data acquired by means of a compression method according to the invention; and the decompression, by the receiver, of the compressed data so transferred, by means of a decompression method according to the invention.

The embodiments of the invention may have one or more of the characteristics of the dependent claims.

According to another aspect, the invention further concerns a tangible and non-transitory information recording medium containing instructions for executing a method according to the invention when these instructions are executed by an electronic calculator.

According to another aspect, the invention finally concerns an electronic calculator to carry out the foregoing compression method and/or decompression method.

BRIEF DESCRIPTION OF THE DRAWINGS

The invention will be better understood upon perusal of the following description, given solely as a nonlimiting example, and referring to the drawings, in which:

FIG. 4 is a flow chart of a method of compressing of the data shown in FIG. 2;

FIG. 5 is a schematic illustration of a portion of the object shown in FIG. 2 as has been modified as a result of a step of the method of FIG. 4;

FIGS. 6A to 6C are schematic illustrations of portions of the mesh of the object shown in FIG. 1 as modified during the execution of a step of the method of FIG. 4;

FIGS. 7A and 7B are schematic illustrations of the object shown in FIG. 1 after application of the method of compression of FIG. 4;

FIGS. 8A and 8B are schematic illustrations of the object shown in FIG. 1 after application of the method of compression of FIG. 4 when a step of duplication of vertices is omitted from this method;

In these figures, the same references are used to denote the same elements.

In the following description, the characteristics and functions which are well known to the skilled person shall not be described in detail.

DETAILED DESCRIPTION

Figure 1:
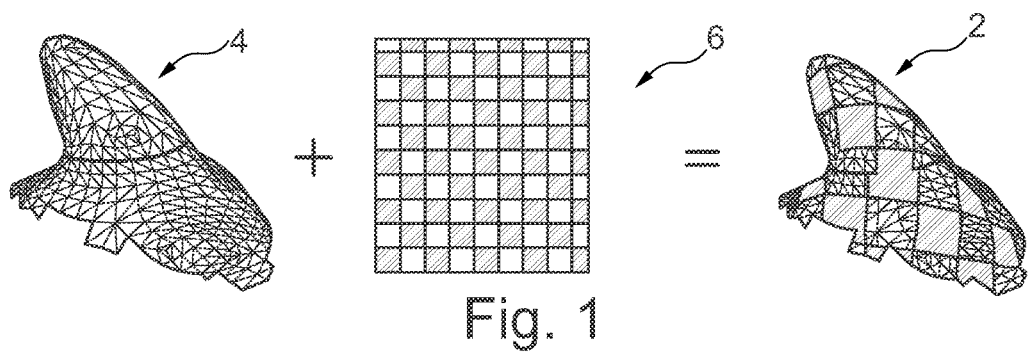
FIG. 1 is a schematic illustration of a three-dimensional digital object.

FIG. 1 shows a three-dimensional original object 2, which in this example is a frog. A checkerboard texture has been applied to the original object 2. This original object 2 comprises a mesh 4 and a texture atlas 6. The texture atlas 6 presents a black-and-white checkerboard pattern that covers the entire outer surface of the mesh 4.

Planar polygons contiguous with each other form the polygonal mesh 4. Each polygon comprises vertices, edges joining the vertices of the polygon two-by-two, and a face bounded by the edges. In the examples shown herein, the mesh 4 contains no hole.

The texture atlas 6 comprises a plurality of individual textures, each of which covers a face of a polygon in the mesh 4. Each texture is a two-dimensional image. In some embodiments, the image is a raster image. The technique illustrated herein is referred to as "texture mapping."

In the illustrated embodiments, the polygons are triangular. In fact, most graphical processing units are optimized for processing triangular polygons. Thus, throughout this description, the terms "triangle" and "polygon" are interchangeable unless otherwise indicated.

Figure 2:
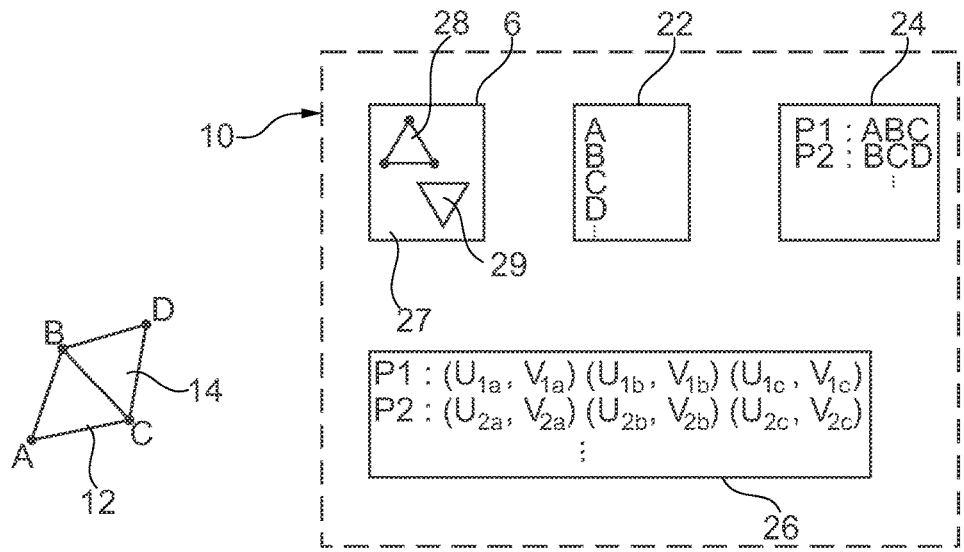
FIG. 2 is a schematic illustration of a set of data representing a portion of the object shown in FIG. 1.

FIG. 2 shows a digital data-set 10 that is used to represent the original object 2. In one example, the data set 10 is compatible with the standard "OpenGL" (open graphics library).

For simplicity, only first and second triangles 12, 14 of the mesh 4 as stored in the data-set 10 will be described herein. The first and second triangles 12, 14 can be seen in FIG. 2.

Throughout this description, the original object 2 and the data set 10 representative of the original object 2 shall be referred to interchangeably. Thus, "acquisition of the original object 2" means "acquisition of the data set 10 that represents that original object 2."

The data set 10 comprises the texture atlas 6, a vertex list 22, which lists the vertices of the polygons of the mesh 4, a polygon list 24, which lists the polygons of the mesh 4; and a texture list 26, which lists texture coordinates of the polygons of the mesh 4.

The texture atlas 6 contains all the textures needed to fill in each face of each polygon of the mesh 4. Each texture of a face of a polygon is indexed within the texture atlas 6 by a set of three UV coordinates (Ua, Va), (Ub, Vb), and (Uc, Vc).

For example, when the texture atlas 6 contains a two-dimensional raster image 27, as shown in FIG. 2, UV coordinates, (Ua, Va), (Ub, Vb), and (Uc, Vc), code the positions of three points in an orthonormalized reference system of the image 27. These three points delimit a "texture piece" of the image 27. It is this texture piece that fills in the face of a polygon.

Each texture piece has the same shape as the polygon to which it corresponds. Thus, each texture piece has a triangular shape that has exactly the same dimensions as the face of the polygon that it is intended to fill. However, the vertices of the texture pieces are not vertices of the mesh 4. To avoid any confusion, the term "point" shall designate a vertex of a texture piece.

The first and second polygons 12, 14 have corresponding first and second texture pieces 28, 29 in the image 27. The first texture piece 28 has UV coordinates (U1a, V1a), (U1b, V1b), and (U1c, V1c). The second texture piece 29 has UV coordinates (U2a, V2a), (U2b, V2b), and (U2c, V2c).

Typically, the texture atlas 6 is organized such that the textures presenting different graphical properties are put in distinct locations of the image 27. An example of a graphical property would be a value representative of pixel intensities.

The vertex list 22 contains, for each vertex, the coordinates of that vertex as expressed in a reference system in space. In the example shown in FIGS. 2, A, B, and C are vertices of the polygon 12. The second polygon 14 comprises the vertices B, C, and D since, in this example, the first and second polygons 12, 14 are adjacent and the vertices B and C are shared by the first and second polygons 12, 14.

The polygon list 24 contains, for each polygon, an entry enumerating those vertices from the vertex list 22 that are contained in this polygon. For example, the entry for the polygon 12 in the polygon list 24, denoted "P1," contains the vertices "ABC".

The texture list 26 contains, for each polygon of the polygon list 24, a set of UV coordinates defining the texture piece associated with this polygon. For example, the entry "P1" associated with the first polygon 12 contains the coordinates, denoted (u1, v1), of the three points that delimit the first texture piece 28 in the texture atlas 6. The same goes for the entry, denoted P2, corresponding to the second polygon 14. The entry P2 is associated, by the texture list 26, with the coordinates (u2, v2) of the three points that delimit the texture piece 29.

Figure 3:
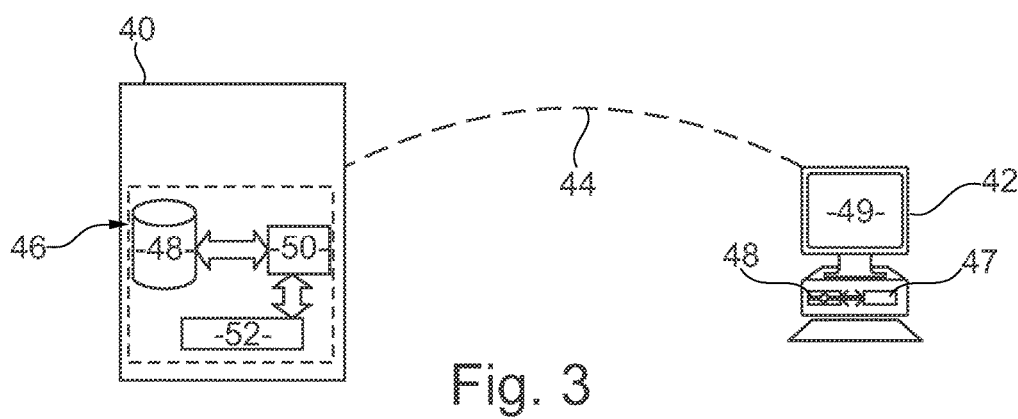
FIG. 3 is an illustration of a device for transmitting the data shown in FIG. 2.

FIG. 3 shows an example of a device for transmitting the original object 2 from a transmitter 40 to a receiver 42. The transmitter 40 and the receiver 42 exchange data between them using a data-exchange link 44. Generally, the transmitter 40 and the receiver 42 are separated from each other by several meters or several kilometers. The data-exchange link 44 is typically a link established by means of a long-distance information transmission network such as the Internet (World Wide Web).

The transmitter 40 comprises a transmitter calculation-unit 46 that includes an information-recording medium 48, a programmable electronic calculator 50, and a data-exchange interface 52.

The information-recording medium 48 contains the instructions needed to execute the compression method described in connection with FIG. 4. The electronic calculator 50 reads and executes the instructions recorded on the information-recording medium 48. The data-exchange interface 52 enables the data set 10 to be exchanged and transferred on the data-exchange link 44.

In some embodiments, the transmitter 40 is a multimedia content-distribution server. In such embodiments, the receiver 42 is a client terminal, such as a computer or a mobile communication device. In particular, the receiver 42 is capable of displaying, or rendering, the original object 2. To accomplish this, the receiver 42 comprises a graphical processor 48 and a receiver calculation-unit 47 that is similar to the transmitter calculation-unit 46.

The transmitter 40 compresses the data set 10 and sends it to the receiver 42, which then decompresses it and renders the original object 2 on a screen 49.

One example of compression of the data set 10 shall be described at first referring to the flow chart in FIG. 4 and with the aid of FIGS. 1 to 7C. This method is a method of progressive compression of the mesh.

During a first step 60, the transmitter calculation-unit 46 acquires the data set 10.

Then, in a second step 62, the mesh 4 is formatted for the following steps of the compression method. These steps, and especially the simplification, will be described in more detail in the following.

The second step 62 involves, first of all, a finding operation 64 during which first and second adjacent polygons having different textures are found among the polygons of the mesh 4. Two textures are said to be different if the intersection of corresponding texture pieces in the texture atlas 6 is a zero set, that is, the texture pieces are completely separated in the texture atlas 6. For example, the first and second texture pieces 28, 29 are separated since the shortest distance between them is non-zero.

Two polygons are said to be adjacent if they have, between them, a first and second shared vertex and if they are joined together by a shared edge.

In the illustrated embodiment, the first and second polygons 12, 14 are adjacent because they have shared vertices B, C that define a common edge. Moreover, their respective first and second texture pieces 28, 29 are different. As used herein, references to polygons 12, 14 shall be assumed to be references to adjacent polygons, and references to shared vertices B, C shall be assumed to refer to the shared vertices of those polygons 12, 14.

In the embodiment described herein, the first and second polygons 12, 14 are identified by automatic searching, with the aid of the polygon list 24 and the texture list 26, for polygons that are both adjacent to each other and also associated, by the texture list 26, with separate texture pieces.

Once such polygons 12, 14 have been identified, the second step 62 involves, for each pair of polygons so identified, separating those polygons.

The process of separating polygons begins with a vertex-splitting operation 66 during which the vertices B and C are replaced, in the polygon 14, with vertices B' and C'. The vertices B' and C' are known as "split vertices." The vertices B' and C' occupy respectively the same positions in space as the vertices B and C. Thus, they have the same coordinates as the vertices B and C.

In some practices, the split vertices B' and C' are created in the vertex list 22 and the definition BCD of the polynomial 14 in the polygon list 24 is replaced with the definition B'C'D. As a result, a new edge B' C' is created in the data set 10 and the edges BD and CD of the polygon 14 are replaced with these new edges B'D and C'D, respectively. This results in a modified polygon 14', as shown in FIG. 5. In this description, an edge that directly joins two vertices X and Y in a polygon shall have the reference "XY."

During an edging operation 68, at least two edges of zero length are created: a first edge between the vertices B and B' and a second edge between the vertices C and C'. This creates at least one intermediate polygon interposed between the polygons 12 and 14'. These edges BB' and CC' join together the polygons 12, 14'. This connection is necessary in order to avoid the appearance of a supplemental artifact at the junction of the polygons 12, 14', such as the appearance of a hole. The face of this intermediate polygon has a zero surface. This means that it is not visible on a screen, and that it therefore creates no visible artifact. As shown in FIG. 5, since the polygons of the mesh 4 are necessarily triangles, there are two intermediate triangles 67, 69 interposed between the polygons 12 and 14' that are created. For example, a supplemental edge B'C is created to form the first and second intermediate triangles 67, 69. The first intermediate triangle 67 is delimited by the edges BC, CB' and BB' and the second intermediate triangle 69 is delimited by the edges B'C', CC' and CB'. The new edges BB', CC', and CB' are created by adding the definitions of the first and second intermediate triangles 67, 69 to the polygon list 24. The first and second intermediate triangles 67, 69 have a texture value of zero. As a result, the texture list 26 does not match them to any texture piece.

To facilitate an understanding of FIG. 5, the first and second intermediate triangles 67, 69 are drawn with a non-zero surface face even though, as explained above, they have a zero surface. Likewise, in FIG. 5, the edges BB', CC' are represented with a nonzero length even though, as explained above, this is not the case. The fact that a polygon has a face with zero area does not mean it does not exist in the mesh 4, since every polygon there is defined as a function of its vertices in the polygon list 24. The same is true of the edges.

The vertex-splitting operation 66 and the edging operation 68 come down to a corresponding modification of the vertex list, 22, the polygon list 24, and the texture list 26 of the data set 10 to reflect the modifications to the mesh 4.

The duplication of the vertices B and C, and their replacement n the polygon 14 with the vertices B' and C', makes it possible to separate the polygons 12, 14 from each other. This prevents losing the information that a texture difference exists between these two polygons when one of the vertices B and C is deleted. Moreover, the fact that the vertices B' and C' are joined to the vertices B and C by edges prevents the polygons 12, 14' from being displaced relative to each other during the rest of the method. Such a displacement would create holes in the mesh 4, which would degrade the graphical quality of the original object 2. The zero value of the lengths of the edges and of the surface of the face of the polygons 67, 69 mean that this duplication of the vertices B and C does not entail a modification of the exterior graphical appearance of the mesh 4 and thus of the original object 2. These edges make possible a local modification of the connectivity of the mesh 4, so that further simplification operations that are based on connectivity information do not result in too rapid a disappearance of these polygons.

When no other pair of adjacent polygons with different texture is found in the modified data set 10, the second step 62 finishes. Once the second step 62 finishes, the mesh 4 has no adjacent polygons of different texture.

A third step 70 simplifies the mesh 4. This simplification involves deleting vertices, and thus polygons, from the mesh 4. The purpose of this simplification is to create new polygons having a broader face than the deleted polygons. These new polygons will replace the deleted polygons. The resulting simplified image thus takes up less space in memory.

The third step 70 includes an identification operation 72, a deletion operation 74, and a creation operation 76.

The identification operation 72 identifies, as a function of a predetermined criterion, vertices to be deleted. Although a variety of ways are available for executing the identification operation 72, a suitable way to do so is to select the vertices from the vertex list 22 on the basis of connectivity criteria, such as the number of their closest neighbors.

The deletion operation 74 deletes the vertices thus identified and the edges joining these vertices to each other and to other vertices of the mesh 4. The deletion operation 74 thus results in deleting polygons from the mesh 4.

The creation operation 76 creates new edges and new textures. The new edges join the vertices that have not been deleted, thus creating the new polygons. The new textures cover the faces of the new polygons from the respective textures of the deleted polygons.

Known methods for executing the third step 70 are described in "Rate-distortion optimization for progressive compression of 3D mesh with color attributes", Ho Lee et al., The Visual Computer, vol. 28, p. 137-153; Springer Verlag, May 2011, DOI: 10.1007/s00371-011-0602-y and P. Alliez et al. "Progressive compression for lossless transmission of triangle meshes", ACM Proceedings of SIGGRAPH, p. 195-202, 2001, the contents of which are herein incorporated by reference.

FIGS. 6A to 6C illustrate the functioning of this algorithm on a portion 80 of the mesh 4.

This algorithm functions in two steps: a conquest phase and a clean-up phase.

The identification operation 72 and the deletion operation 74 are carried out during a conquest phase. During this phase, the algorithm traverses the vertices of the mesh 4 automatically, step by step. This involves moving along the edges of the mesh 4 in the fashion of a graph. A predefined "graph traversal" defines the order in which the algorithm traverses the vertices.

For each vertex encountered during traversal, the algorithm determines a "valence" of that vertex. The "valence" of a vertex is the number of immediate neighbors S' of that vertex to which it is directly connected by edges. If a vertex S has a valence less than a predetermined threshold, the algorithm deletes both that vertex and the edges SS' joining it its immediate neighbors. These edges SS' can be seen in FIG. 6A. The algorithm then creates new edges 80, 81, 82 that are to replace the deleted edges SS'. These new edges can be seen in FIG. 6B.

In the clean-up phase, the algorithm advantageously deletes certain excess vertices 83 as well as the edges joining those vertices. It then creates new edges as replacements. This results in new polygons 84 having a regular form. The creation operation 76 creates these new edges during the clean-up phase.

The identification operation 72, the deletion operation 74, and the creation operation 76 also modify of the vertex list 22, the polygon list 24, the texture list 26, and the texture atlas 6 to reflect the modifications made to the mesh 4.

Advantageously, the third step 70 also includes a recording operation 89 that records incremental, or refinement, data. This incremental data indicates which vertices and the edges were deleted as well as which vertices and edges were created during the third step 70.

In some practices, the incremental data contains a list of the vertices deleted during the third step 70, as well as a list giving, for each of these deleted vertices, the set of neighboring vertices to which this deleted vertex was directly connected by an edge. The incremental data, when used as part of a decompression method, make it possible to perform operations that are the inverses of the operations performed during the third step 70. This makes it possible to reconstruct the mesh 4 such as it existed prior to the application of the third step 70 from the simplified mesh obtained at the end of the third step 70 and this incremental data. In some practices, the incremental data also includes information making it possible to find the texture piece associated with each reconstructed polygon without loss of information.

The third step 70 simplifies the original object 2 into a simplified object 94 that has fewer vertices and polygons than the original object 2. Because of this lower resolution, the data set required to represent the simplified object 94 is smaller than the data set 10 required to represent the original object 2. This facilitates transmission of the simplified object 94.

Some practices repeat the simplification several times in order to obtain a higher compression ratio. Referring to FIG. 4, such practices include, at the end of the third step 70, a fourth step 91 for additional simplification. In a typical practice, the fourth step 91 is identical to the third step 70, except that it is performed on the simplified object 94 in order to further simplify it. Typically, with each iteration of the fourth step 91, the algorithm broadens the selection criteria for the vertices to be deleted, thereby ensuring the deletion of additional vertices.

One thus obtains, at the end of the fourth step 91, a final object 96, as illustrated in FIG. 7B. The final object 96 contains even fewer vertices and polygons than the simplified object 94 that precedes it. The final object 96 is thus an even more simplified version of the original object 2 than the simplified object 94. The incremental data generated during this performance of the fourth step 91 is likewise recorded as discussed in connection with the recording operation 89.

Referring back to FIG. 4, during a fifth step 92, the final object 96 is transmitted to the interface 50.

The present method is particularly advantageous for reducing the appearance of graphical artifacts in the simplified object 94 and in the final object 96 at the end of their compression.

Progressive compression methods ignore texture differences between adjacent polygons. As a result, the vertices B and C of the first and second polygons 12, 14 may be quickly deleted during the deletion operation 74. The first and second polygons 12, 14 are then deleted and replaced by new polygons. The texture of the polygons is then replaced by a new texture determined from the points of the first and second texture pieces 28, 29.

For example, it often happens that one of these new polygons ends up being associated with a new texture piece defined by two points of the second texture piece 29 and one point of the first texture piece 28. This new piece includes a portion of the image 27 located between the first and second texture pieces 28, 29. This portion is often completely different from the first and second texture pieces 28, 29. This then causes the appearance, at the location of the polygons 12, 14 in the simplified object 94, of a texture piece that is very different and thus particularly visible. This creates a graphical artifact that is particularly conspicuous on account of the texture difference between the first and second polygons 12, 14.

To illustrated the distinction, FIG. 8A illustrates another simplified object 94' that results from compression of the original object 2 but with the second step 62 having been omitted. The procedure used is identical to that shown in FIG. 4, but without the optional fourth step 91. Similarly, FIG. 8B shows another final object 96' that results from having compressed the original object 2 using the third and fourth steps 70, 91 but with the omission of the second step 62.

A comparison of the compressed FIGS. 7A and 7B with the compressed FIGS. 8A and 8B shows the unmistakable benefit of the second step 62. As is apparent, a graphical artifact 100 present in FIG. 8A is nowhere to be seen in FIG. 7A. Similarly, a graphical artifact 102 present in FIG. 8B is nowhere to be seen in FIG. 7B.

These artifacts 100, 102 arose directly as a result of omitting the second step 62. They correspond to polygons whose texture information has been lost in whole or in part during the third or fourth steps 70, 91. This loss of information results from the deletion of adjacent polygons having different textures. Since these polygons were not subjected to a separation during the second step 62 prior to the simplification step, they were deleted during the deletion operation 74.

In contrast, the method of FIG. 4 retains information indicating that the adjacent first and second polygons 12 and 14. This is because none of the vertices B, B', C, C' have actually been deleted. This information may eventually be lost after enough iterations of the third and fourth steps 70, 91. However, in most practical cases, the procedure described herein avoids these artifacts.

Now, as will be understood from perusal of the following, the later the stage of compression in which the visual artifact appears, the more quickly it disappears during the decompression. With the method of FIG. 4, during the decompression the artifacts are thus deleted or are much more ephemeral.

Figure 9:
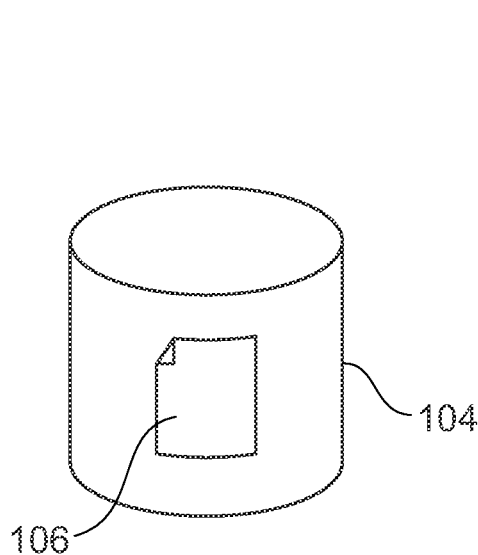
FIG. 9 is a schematic illustration of an information recording medium containing a set of data representative of the three-dimensional digital object compressed as a result of the method of FIG. 4.

FIG. 9 shows an information recording medium 104 containing a data set 106 representative of the final object 96.

The simplified final object 96 is afterwards sent by the transmitter 40 to the receiver 42, in order to be rendered there. Likewise, the incremental data respectively associated with each execution of the third or fourth step 70, 91 is sent from the transmitter 40 to the receiver 42. In some practices, this transmission is done sequentially.

Figure 10:
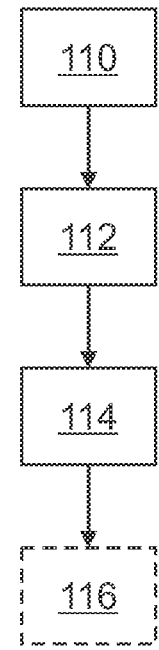
FIG. 10 is a flow chart of a method of decompression of the objects of FIGS. 7A to 8B in order to reconstruct the object of FIG. 1.

FIG. 10 illustrates the decompression method to reconstruct the original object 2. An example of such a method is that described in French patent application FR2998685.

During an acquisition step 110, the receiver 42 acquires data representative of the final object 96, the data having been sent from the transmitter 40. The receiver 42 then immediately renders the object 96 so received.

Next, during a first reconstruction step 112, the receiver 42 automatically reconstructs the simplified object 94 from the final object 96. It does so with the help of the incremental data that was generated during the fourth step 91. To do so, the receiver 42 performs operations that are inverses of those performed during the fourth step 91.

The receiver 42 typically receives incremental data after it has already received the data representing the final object 96. In some cases, the receiver 42 receives this incremental data after having already rendered the final object 96 on the screen 49.

From the incremental data, the receiver 42 modifies the final object 96. Such modification includes restoring those vertices of the mesh 4 that had been deleted during the fourth step 91. In doing so, the receiver 42 deletes of certain polygons of the mesh of the object 96 and replaces them with substitute polygons that are more numerous and that have a more reduced surface area.

In particular, the receiver 42: adds, to the final object 96, those vertices that were deleted during the simplification carried out during the fourth step 91. It then replaces those edges of the mesh that were created during the fourth step 91 with supplemental edges that join the added vertices to the existing vertices of the object 96. This creates supplemental polygons. Finally, it creates supplemental texture pieces for these supplemental polygons from the respective textures of the replaced polygons and from the incremental data.

At the end of the first reconstruction step 112, the receiver 42 will have reconstructed the simplified object 94. The receiver 42 then renders the simplified object 94 in place of the final object 96 on the screen 49.

Then, during a second reconstruction step 114, the receiver 42 reconstructs the original object 2 from the simplified object 94. It does so with the aid of the incremental data that was generated during the third step 70. In some practices, the second reconstruction step 114 is identical to the first reconstruction step 112, except that it is applied to the simplified object 94 rather than to the final object 96.

The original object 2 is thus progressively reconstructed, by successive refinements, from incremental data, with an increasing precision in the course of their reception, until reaching a level of detail identical or close to that which it had prior to the compression. The intermediate simplified objects, such as the simplified object 94, are rendered as soon as they are reconstructed. The receiver 42 thus renders objects whose precision increases as it receives the incremental data and performs the steps of reconstruction.

This method is useful when the flow rate of the data-exchange link 44 is limited or subject to major variations because it prevents the rendering of the object at the receiver 42 from being disturbed by a "lag" effect. This method also limits the waiting time for the object to be rendered (even in a simplified version) by the receiver 42, as compared to the case in which it would be necessary to wait for the whole compressed original object 2 to be sent to the receiver 42 before being able to start the decompression and then the rendering.

Since the simplified objects are rendered during the decompression in the inverse order of their creation by the compression, the later the visual artifact appears during the compression the more quickly it will disappear during the decompression and thus from the progressive rendering of the decompressed object.

Advantageously, during a formatting step 116, the mesh of the reconstructed original object 2 is formatted to delete the vertices and edges that were created during the second step 62. This formatting step 116 involves replacing the vertices B', C' respectively with the vertices B, C and deleting the edges BB', CC', and B' C.

Thus, the polygons 67, 69 are deleted and the polygons 12, 14 once again take on their initial configuration in the original object 2.

Many other embodiments are possible.

The object 2 can be different. It may involve any object able to be represented in the form of a mesh. Likewise, the texture atlas 6 can be chosen differently.

The polygons may be other than triangular. For example, the polygons may be parallelograms.

In some embodiments, the data set 10 is recorded in a format compatible with a different graphical standard, such as Direct3D.

The transmitter 40 may be different. For example, the transmitter calculation-unit 46 may be distinct from the transmitter 40. In such cases, the compression of the original object 2 is not done by the transmitter 40. Instead, the transmitter's only role is that of transferring the data to the receiver 42.

The receiver 42 may be different. For example, the receiver 42 may be a tablet, a mobile telephone, or a television set. The rendering of the original object 2 may likewise be done independently of the reception. The term "receiver" 42 thus encompasses two distinct devices, one receiving the original object 2 and the other one rendering this original object 2.

The second step 62 may be performed in different ways.

Figure 11:
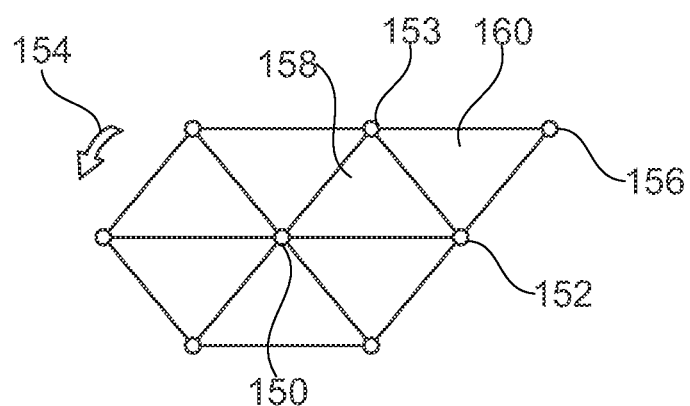
FIG. 11 is a schematic illustration of another embodiment of a step of the method of FIG. 4.

In particular, the finding operation 64 can be performed differently in order to identify adjacent polygons. For example, FIG. 11 illustrates another method of identifying the polygons 12, 14 in a portion of the mesh 4. By this method, the edges of the mesh are automatically traversed by selecting the vertices of the mesh one after another in a predetermined order. For each selected vertex 150, all of the vertices 152, 153 immediately adjacent to this vertex 150 are traversed, moving about the vertex 150 in a predefined direction, identified here by the arrow 154. These adjacent vertices are defined as being the vertices directly connected to the vertex 150 by an edge. For simplicity, only the vertices 152 and 153 are denoted by a reference number. One then determines vertices 152 and 153 having another immediately adjacent shared vertex 156 other than the vertex 150, if such exist. If so, this indicates that the vertices 152, 153 are shared by several polygons. In this example, one identifies the adjacent polygons 158 and 160. The polygon 158 comprises the vertices 150, 152 and 153. The polygon 160 comprises the vertices 152, 153 and 156. One then checks to make sure that the texture pieces associated with the polygons 158 and 160 are different.

As a variant, it is the vertices B, C of the polygon 12 that are replaced with the vertices B', C'.

The fourth step 91 may be omitted. In this case, the object 94 is the final object that is transmitted. The first reconstruction step 112 is then omitted from the decompression method.

Other practices of the method include repeating the fourth step 91 several times. This increases the compression level of the original object 2 prior to its transmission. The decompression method then includes a number of steps identical to the first reconstruction step 112, the number equaling the number of times that the fourth step 91 was repeated.

In another practice of the method, when the fourth step 91 is performed at least once, then the second step 62 is repeated, for example, prior to each performance of the fourth step 91. If the polygons 67, 69 were deleted during a performance of the fourth step 91, they may thus be recreated before performing the fourth step 91 once more. This limits the risk of the polygons 12, 14 being deleted during the fourth step 91. In this case, the formatting step 116 may be repeated several times. For example, the formatting step 116 is applied during the decompression after the first reconstruction step 112 or after the second reconstruction step 114.

Some practices of the method include performing the third step 70 differently. An alternative way to execute the third step 70 is to use the algorithm described in the following document: Maglo, A., Courbet, C., Alliez, P., "Progressive compression of manifold polygon meshes", Computers and Graphics, 2012, DOI: 10. 1016/j.cag.2012.03.023.

Some practices omit the formatting step 116. Other practices carry out the formatting step 116 after the first reconstruction step 112 to clean up the mesh of the reconstructed object 94 before applying the second reconstruction step 114.

In another practice, during the second step 62, the vertices B', C', just like the vertices B, C, are subject to marking during a fourth operation 180, as shown in FIG. 4. This indicates that they should preferably not be deleted during the third step 70. In such a practice, marking typically includes adding a predefined value of a supplemental data bit added to the vertex list 22 for each vertex. Thus, during the third step 70, a check is done during the identification operation 72 to see if the vertex has such a marking.

For example, a first traversing of all the vertices of the mesh is performed. If an unmarked vertex is found during this first traversal, and that unmarked vertex also meets the criteria for being deleted, then it is deleted. On the other hand, if it has been marked, then it is not deleted right away. Instead, it is identified in a specific list that will only be consulted during a second traversal of the mesh's vertices.

If the third step 70 can end without it being necessary to delete the marked vertex, then the marked vertex will not be deleted. Only if it is impossible not to delete the marked vertex, for example, because its deletion is required in order to preserve certain properties of regularity of the mesh, will it be deleted. In other words, the deletion of the marked vertex is delayed until absolutely necessary.

In some practices, vertex-marking repeats after each application of the third and fourth steps 70, 91. This permits taking account of modifications of the mesh wrought by its simplification. In an extreme case, the deletion of a marked vertex is prohibited. This would guarantee that its deletion will not cause a visual artifact.

Other methods are possible to identify different texture pieces. In a simplified practice, texture pieces are different if they have no point in common in the image 27. In another practice, texture pieces are considered to be different only if the minimum distance separating the two texture pieces exceeds a predetermined threshold. This predetermined threshold may be equal to zero or greater than zero.

Some practices of the method compare representative texture characteristics to decide whether texture pieces are different or not. For example, this characteristic is calculated for each texture piece and then, if the offset between the value of this characteristic for a first piece and a second piece is greater than a predetermined threshold, these texture pieces are said to be different. Examples of suitable characteristic include a median value, a maximum, or a minimum of a histogram of colors contained in the piece. In some practices of the method, the characteristic represents a quantity associated with the graphical pattern appearing in the texture, such as a fractal dimension or a Hurst exponent. The latter approach, which is based on representative characteristics, does not rely on the positions of the points delimiting the texture pieces in the image 27.

Having described the invention, and a preferred embodiment thereof, what we claim as new, and secured by Letters Patent is:

1. A method comprising causing a computer system to carry out compression of data representative of a three-dimensional object, said data comprising a mesh that is formed by a plurality of planar polygons that are contiguous with each other and a texture atlas that lists textures of all polygons in said mesh, each polygon comprising vertices that are joined by edges that delimit a face of said polygon and a texture that covers said face, wherein causing said computer system to carry out compression of said data comprises causing said computer to acquire said data and causing said computer to carry out the act of simplifying said mesh, wherein simplifying said mesh comprises deleting vertices from said mesh, thereby deleting polygons and creating, in place of said deleted polygons, new polygons that have faces that are broader than those of said polygons that have been deleted, wherein deleting said vertices from said mesh comprises identifying, as a function of a predetermined criterion, vertices to be deleted from said mesh, before deleting said identified vertices, identifying, in said mesh, first and second adjacent polygons that have different textures and that also have first and second shared vertices that are joined by a shared edge, providing a third vertex that occupies the same position in space as said first shared vertex in said second polygon, providing a fourth vertex that occupies the same position in space as said second shared vertex, creating a first edge between said first vertex and said third vertex, creating a second edge between said second vertex and said fourth vertex, creating an intermediate polygon that is interposed between said first and second polygons, deleting said identified vertices and edges that join said identified vertices to other vertices of said mesh, thereby deleting polygons comprising said identified vertices and said edges, creating new edges to join vertices that have not been deleted, thereby creating new polygons, and based at least in part on textures of said deleted polygons, creating new textures for said new polygons, wherein two polygons are adjacent if said polygons have a first shared vertex and a second shared vertex that are joined together by a shared edge, wherein said first edge has zero length, and wherein said second edge and said first edge have the same length, and wherein said intermediate polygon has a surface area of zero.

2. The method of claim 1, further comprising, prior to deleting said vertices, marking said first, second, third, and fourth vertices, wherein identifying, as a function of a predetermined criterion, vertices to be deleted from said mesh comprises identifying said first, second, third, and fourth vertices as meeting said predetermined criterion for deletion, and wherein simplifying said mesh comprises refraining from deleting said first, second, third, and fourth vertices even though said first, second, third, and fourth vertices have been found to meet said predetermined criterion.

3. A method comprising causing transmission of data representative of a three-dimensional digital object between a transmitter and a receiver, said method comprising, at said transmitter, acquiring data representative of said three-dimensional digital object, compressing said data using the method recited in claim 1, transferring said compressed data to said receiver through a data-exchange link, and, at said receiver, decompressing said compressed data, wherein decompressing said compressed data comprises reconstructing a more complex mesh from said simplified mesh and said incremental data, wherein reconstructing said more complex mesh comprises creating supplemental vertices in said simplified mesh from said incremental data acquired and replacing edges of said simplified mesh with supplemental edges by joining said supplemental vertices to existing vertices, thereby deleting polygons from said simplified mesh and replacing said deleted polygons with supplemental polygons that have a smaller surface than said corresponding deleted polygons, creating supplemental textures for said supplemental polygons based at least in part on respective textures of said polygons that has been replaced and said incremental data, wherein said more complex mesh comprises said first and third vertices joined together by an edge of zero length and said second and fourth vertices joined together by an edge of zero length.

4. The method of claim 1, further comprising determining that an intersection of first and second textures is zero in said texture atlas, and, based on said determination, determining that said first and second textures differ.

5. The method of claim 1, further comprising determining a shortest distance that separates first and second textures in said texture atlas, determining that said shortest distance exceeds a predetermined threshold, based on said determination that that said shortest distance exceeds a predetermined threshold, determining that said first and second textures differ from each other.

6. A manufacture comprising a tangible and non-transitory computer-readable medium having encoded thereon instructions for causing a computer to execute the method recited in claim 1.

7. An apparatus comprising a digital information processing system configured to carry out the method recited in claim 1.

8. A manufacture comprising a non-transitory computer-readable medium having encoded thereon data representative of a compressed three-dimensional object, said data comprising a simplified mesh and incremental decompression data, wherein said simplified mesh is formed from a plurality of planar polygons using a compression method, wherein said incremental decompression data comprises a list of vertices and edges that were deleted from said mesh during said execution of said compression method, wherein at least one of said simplified mesh and said incremental decompression data encodes first, second, third, and fourth vertices of said mesh such that said first and third vertices are joined together by an edge of zero length and said second and fourth vertices are joined together by an edge of zero length, wherein said compression method comprises causing a computer system to carry out compression of data representative of said three-dimensional object, said data comprising a mesh that is formed by said planar polygons and a texture atlas, wherein said planar polygons are contiguous with each other and wherein said texture atlas lists textures of all polygons in said mesh, wherein each polygon comprises vertices that are joined by edges that delimit a face of said polygon and a texture that covers said face, wherein causing said computer system to carry out compression of said data comprises causing said computer to acquire said data and causing said computer to carry out the act of simplifying said mesh, wherein simplifying said mesh comprises deleting vertices from said mesh, thereby deleting polygons and creating, in place of said deleted polygons, new polygons that have faces that are broader than those of said polygons that have been deleted, wherein deleting said vertices from said mesh comprises identifying, as a function of a predetermined criterion, vertices to be deleted from said mesh, before deleting said identified vertices, identifying, in said mesh, first and second adjacent polygons that have different textures and that also have first and second shared vertices that are joined by a shared edge, providing said third vertex that occupies the same position in space as said first shared vertex in said second polygon, providing said fourth vertex that occupies the same position in space as said second shared vertex, creating a first edge between said first vertex and said third vertex, creating a second edge between said second vertex and said fourth vertex, creating an intermediate polygon that is interposed between said first and second polygons, deleting said identified vertices and edges that join said identified vertices to other vertices of said mesh, thereby deleting polygons comprising said identified vertices and said edges, creating new edges to join vertices that have not been deleted, thereby creating new polygons, and based at least in part on textures of said deleted polygons, creating new textures for said new polygons, wherein two polygons are adjacent if said polygons have a first shared vertex and a second shared vertex that are joined together by a shared edge, wherein said first edge has zero length, and wherein said second edge and said first edge have the same length, and wherein said intermediate polygon has a surface area of zero.

9. A method of decompressing data representative of a compressed three-dimensional digital object, said method comprising acquiring data representative of a compressed three-dimensional object said data comprising a simplified mesh and incremental decompression data, reconstructing a more complex mesh from said simplified mesh and said incremental data, wherein reconstructing said more complex mesh comprises creating supplemental vertices in said simplified mesh from said incremental data acquired and replacing edges of said simplified mesh with supplemental edges by joining said supplemental vertices to existing vertices, thereby deleting polygons from said simplified mesh and replacing said deleted polygons with supplemental polygons that have a smaller surface than said corresponding deleted polygons, creating supplemental textures for said supplemental polygons based at least in part on respective textures of said polygons that has been replaced and said incremental data, wherein said more complex mesh comprises first and third vertices joined together by an edge of zero length and second and fourth vertices joined together by an edge of zero length, wherein acquiring data representative of a compressed three-dimensional object comprises obtaining said data from a manufacture that a non-transitory computer-readable medium having encoded thereon said data representative of a compressed three-dimensional object, said data comprising said simplified mesh and said incremental decompression data, wherein said simplified mesh is formed from a plurality of planar polygons using a compression method, wherein said incremental decompression data comprises a list of vertices and edges that were deleted from said mesh during said execution of said compression method, wherein at least one of said simplified mesh and said incremental decompression data encodes said first, second, third, and fourth vertices of said mesh such that said first and third vertices are joined together by an edge of zero length and said second and fourth vertices are joined together by an edge of zero length, wherein said compression method comprises causing a computer system to carry out compression of data representative of said three-dimensional object, said data comprising a mesh that is formed by said planar polygons and a texture atlas, wherein said planar polygons are contiguous with each other and wherein said texture atlas lists textures of all polygons in said mesh, wherein each polygon comprises vertices that are joined by edges that delimit a face of said polygon and a texture that covers said face, wherein causing said computer system to carry out compression of said data comprises causing said computer to acquire said data and causing said computer to carry out the act of simplifying said mesh, wherein simplifying said mesh comprises deleting vertices from said mesh, thereby deleting polygons and creating, in place of said deleted polygons, new polygons that have faces that are broader than those of said polygons that have been deleted, wherein deleting said vertices from said mesh comprises identifying, as a function of a predetermined criterion, vertices to be deleted from said mesh, before deleting said identified vertices, identifying, in said mesh, first and second adjacent polygons that have different textures and that also have first and second shared vertices that are joined by a shared edge, providing said third vertex that occupies the same position in space as said first shared vertex in said second polygon, providing said fourth vertex that occupies the same position in space as said second shared vertex, creating a first edge between said first vertex and said third vertex, creating a second edge between said second vertex and said fourth vertex, creating an intermediate polygon that is interposed between said first and second polygons, deleting said identified vertices and edges that join said identified vertices to other vertices of said mesh, thereby deleting polygons comprising said identified vertices and said edges, creating new edges to join vertices that have not been deleted, thereby creating new polygons, and based at least in part on textures of said deleted polygons, creating new textures for said new polygons, wherein two polygons are adjacent if said polygons have a first shared vertex and a second shared vertex that are joined together by a shared edge, wherein said first edge has zero length, and wherein said second edge and said first edge have the same length, and wherein said intermediate polygon has a surface area of zero.

10. The method of claim 9, further comprising formatting said reconstructed mesh, wherein formatting said reconstructed mesh comprises replacing said third and fourth vertices of said second polygon with said first and second vertex, respectively, and deleting said edges of zero length between said first and third vertices and between said second and fourth vertices.

* * * * *